June 29, 1937.  E. C. LYONS ET AL  2,085,375
INSTRUMENT FOR SOLVING TRIANGLES
Filed Nov. 13, 1934  3 Sheets-Sheet 1

INVENTORS
E. C. LYONS
R. G. McMAHON
BY
ATTORNEY

June 29, 1937.   E. C. LYONS ET AL   2,085,375
INSTRUMENT FOR SOLVING TRIANGLES
Filed Nov. 13, 1934    3 Sheets-Sheet 2
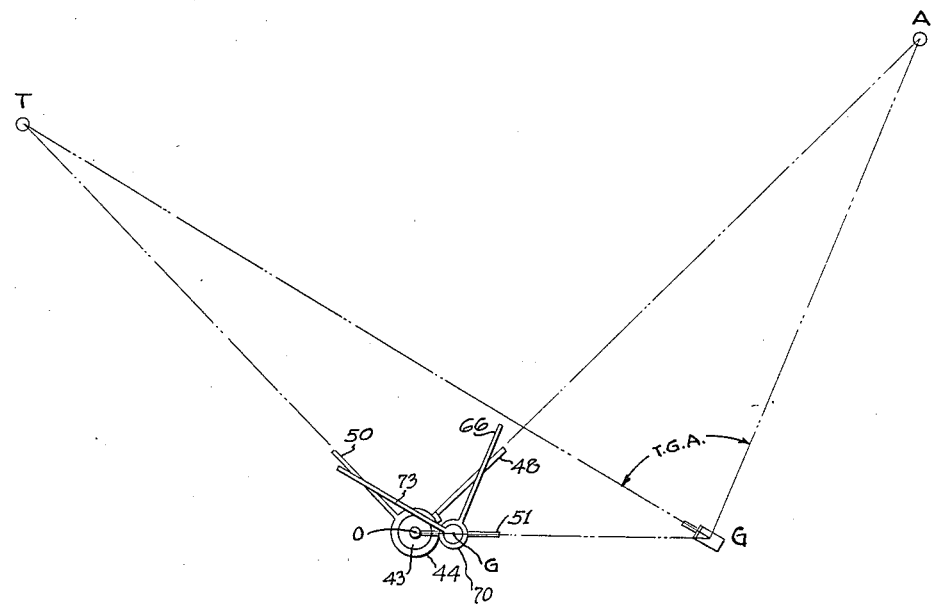
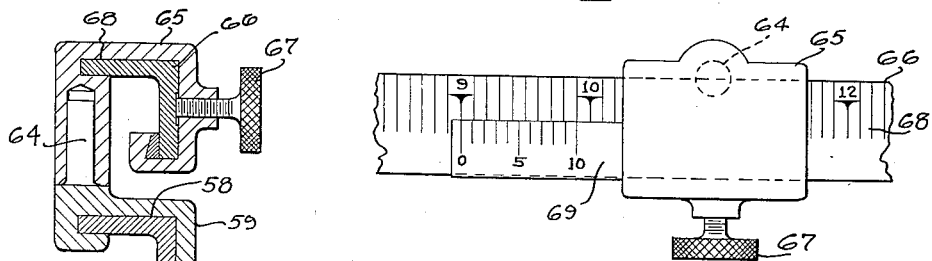
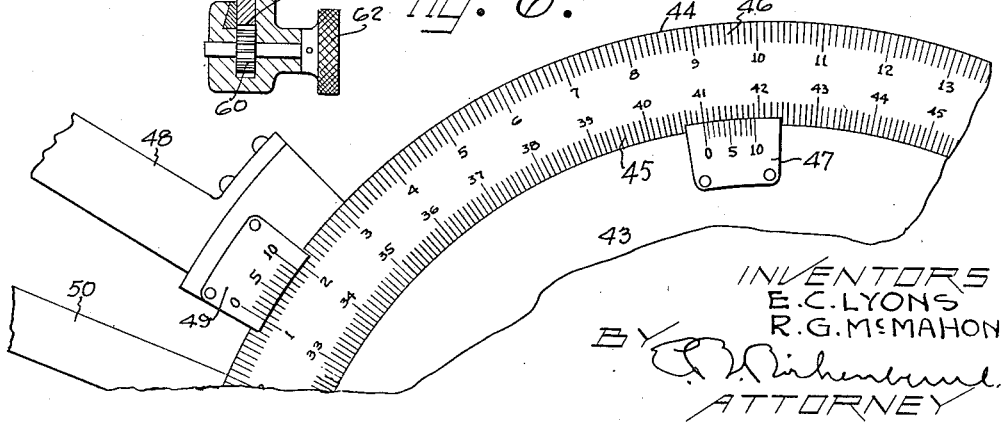
INVENTORS
E. C. LYONS
R. G. McMAHON
BY
ATTORNEY June 29, 1937.   E. C. LYONS ET AL   2,085,375
INSTRUMENT FOR SOLVING TRIANGLES
Filed Nov. 13, 1934   3 Sheets-Sheet 3
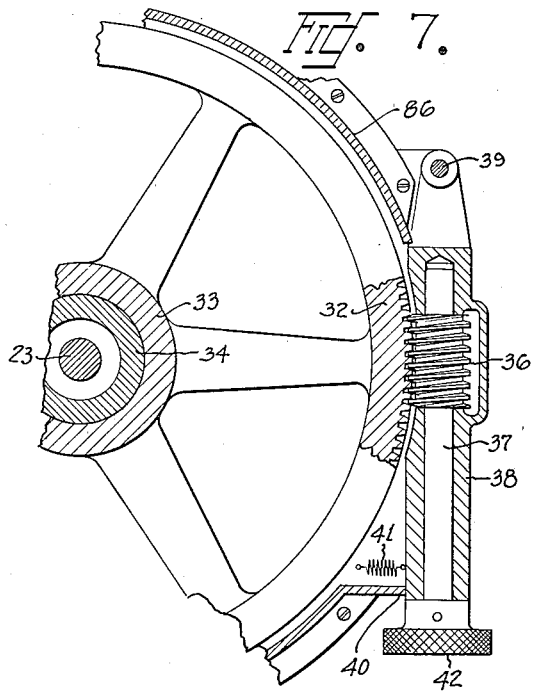
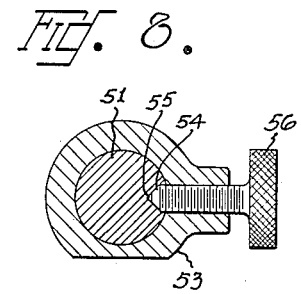
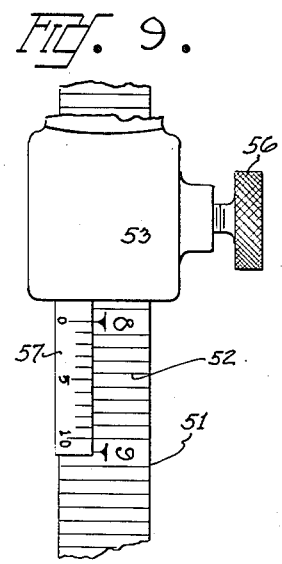
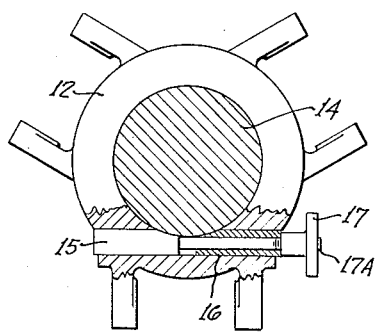
INVENTORS
E. C. LYONS
R. G. McMAHON
BY
ATTORNEY Patented June 29, 1937

2,085,375

UNITED STATES PATENT OFFICE 2,085,375

INSTRUMENT FOR SOLVING TRIANGLES

Ellis C. Lyons and Raymond G. McMahon, Portland, Oreg.

Application November 13, 1934, Serial No. 752,808

5 Claims. (Cl. 33—98)

This invention relates generally to the solution of triangles, and particularly to an instrument by means of which triangles may be solved mechanically.

The main object of this invention is the provision of an instrument for a special use in connection with the control of artillery fire by means of which the range in units of distance such as yards or meters from the gun position to the target, as well as the firing angle in mills or the units of angular measurement may be quickly and accurately determined without the use of mathematics.

This object is accomplished in the manner set forth in the specification following and illustrated in the accompanying drawings, in which:

Fig. 3 is a diagrammatic plan showing a practical application of the instrument in a fire control problem.

Fig. 4 is a section taken along the line 4—4 in Fig. 1.

Fig. 5 is a plan of an upper arm and its vernier.

Fig. 6 is a fragmentary plan view of the azimuth scale.

Fig. 7 is a section taken along the line 7—7 in Fig. 1.

Fig. 8 is a section taken along the line 8—8 in Fig. 1.

Fig. 9 is a plan of a portion of the arm shown in Fig. 8.

Fig. 10 is a horizontal section along the line 10—10 in Fig. 1.

Similar numbers of reference refer to similar parts throughout the several views.

Figure 1:
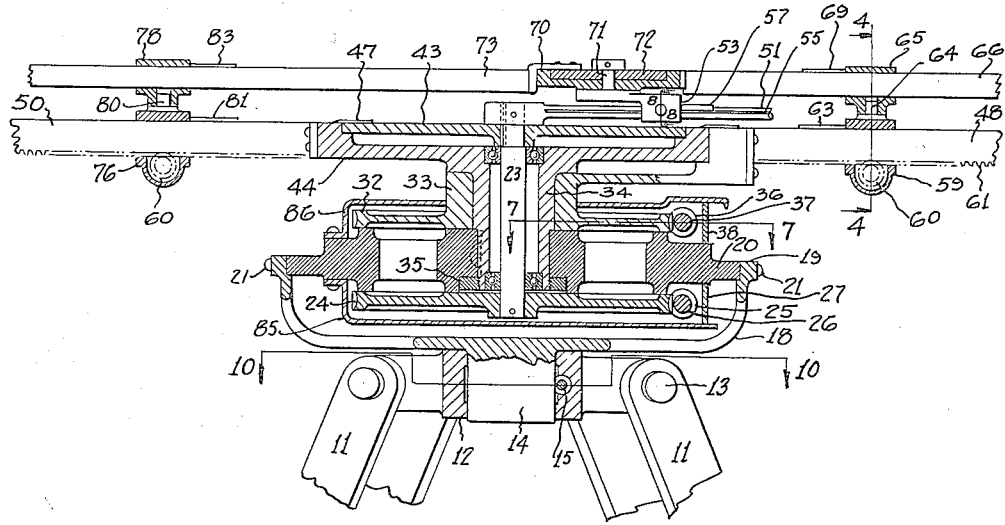
Fig. 1 is an extended vertical section taken along the line 1—1 in Fig. 2.

For the purpose of explaining the operation of this device in its simplest form, which is also adaptable for portable use, for example in field artillery operations, there is shown a tripod comprising the legs 11 and the head 12 to which the legs are secured by means of the bolts 13. Rotatably mounted in the head 12 is the vertical spindle 14 which may be clamped in a fixed position within the head 12 by means of the wedge pin 15 which reacts against the wedge sleeve 16 under the action of a thumb nut 17 on the threaded end 17-A of the pin 15. Obviously, any other form of clamp which is suitable for the purpose may be employed without departing from the spirit of this invention.

Mounted on the spindle 14 and integral therewith is a circular housing 18 in whose upturned sides 19 is secured a base plate 20 by means of the screws 21. Extending through the base plate 20 and journaling in the anti-friction bearings 22 is the main spindle 23 on whose lower end is secured a worm wheel 24 which meshes with a worm 25 whose shaft 26 journals in the hinged arm 27, one end of which is carried by the pin 28 and the other end of which is urged toward a stop 29 by means of a spring 30. Rotation is supplied to the shaft 26 by means of a knurled head 31. The parts 28—31 are not illustrated but are duplicates of parts 39 to 42 shown in Fig. 7.

The worm wheel 24 bears against the under side of the base plate 20. On the top side of the base plate 20 is mounted a worm wheel 32 whose hub 33 is rotatable on the sleeve 34 which extends into and is locked to the base plate 20 by means of the circular nut 35 which occupies a counterbore within the base plate 20. A worm 36 meshes with the worm wheel 32 and its shaft 37 journals in a housing 38 which is hinged on the pin 39. The housing 38 is urged toward a stop 40 by means of a spring 41. The shaft 37 is manually rotated by means of a knurled head 42.

Keyed near the upper end of the main spindle 23 is the gun arm azimuth plate 43 which is rotatable within the dial wheel 44 which is mounted on the sleeve 34 and integral therewith. The dial wheel 44 has formed thereon the gun arm azimuth setting scale 45 and a target arm azimuth scale 46. The plate 43 has secured thereto a vernier 47 by means of which mills and fractions thereof in tenths may be read on the scale 45.

Fixed to the hub 33 is an observation point to aiming point arm 48, which will be referred to as the O. A. arm. The arm 48 is provided with a vernier 49 by means of which readings in mills and tenths thereof may be made on the aiming point azimuth scale 46. Secured to the outer side of the dial wheel 44 is the observation point to target arm 50, which will be referred to as the O. T. arm.

Secured on the upper end of the spindle 23 is the observation point gun arm 51 which is circular in cross section having a scale 52 which is graduated to read in yards. On the arm 51 is a slide 53 which is prevented from rotating on the arm 51 by the screw point 54 which occupies a V groove 55 in the side of the arm 51. The point 54 is formed on the end of a screw having a knurled head 56. To the slide 53 is attached a vernier 57 by means of which fractional readings may be made on the scale 52.

The O. A. arm 48 is right angular in cross section and is provided with a scale 58 which is graduated to read in yards. On the arm 48 is mounted a slide 59 which carries a pinion 60 which meshes with a rack 61 formed on the lower side of the arm 48. A knurled head 62 is utilized to rotate the pinion 60 for the purpose of moving the slide 59 along the arm 48. A vernier 63 is attached to the slide 59 and operates in conjunction with the scale 58.

Extending vertically from the slide 59 is a pivot 64 upon which is mounted a slide 65 which receives the gun aiming point range arm 66 which will hereafter be referred to as a G. A. arm. The arm 66 is also of a right angle cross section and is free to move in the slide 65 when not held by the knurled screw 67, which is threaded into the slide 65 and presses against the vertical leg of the arm 66. The G. A. arm 66 is provided with a G. A. scale 68 which is graduated to read in yards. The slide 65 is provided with a vernier 69 which operates in conjunction with the G. A. scale 68.

On the inner end of the G. A. arm 66 is disposed a circular plate 70 within which is rotatably mounted on the pivot 71 a disk 72. To the disk 72 is attached a gun target range arm 73 which will be referred to as the G. T. arm. A scale 74 in mills is formed on the plate 70, and the disk 72 carries a vernier 75 which operates in conjunction with the scale 74.

The O. T. arm 50 is right angular in cross section, as is the G. T. arm 73, and these two arms are pivotally and adjustably connected to each other in a manner identical with that described for the arms 48 and 66. In this case the slide 76 is moved along the O. T. arm 50 by means of a knurled screw 77, and the slide 78 is clamped to the G. T. arm 73 by means of the knurled screw 79. The slides 76 and 78 pivot on the pin 80.

The slide 76 is provided with a vernier 81 by means of which settings may be made on the yard scale 82 on the O. T. arm 50. The slide 78 is provided with a vernier 83 by means of which readings may be taken from the yard scale 84 on the G. T. arm 73.

It is desirable to provide a cover plate 85 on the under side of the base plate 20 and a cover plate 86 on the top side thereof through which the hub 33 projects and is free to rotate.

In order to give a clearer understanding of the operation of this instrument four positions are shown, namely the observation point which will be referred to as O, the target T, the aiming point A and the gun G.

Figure 2:
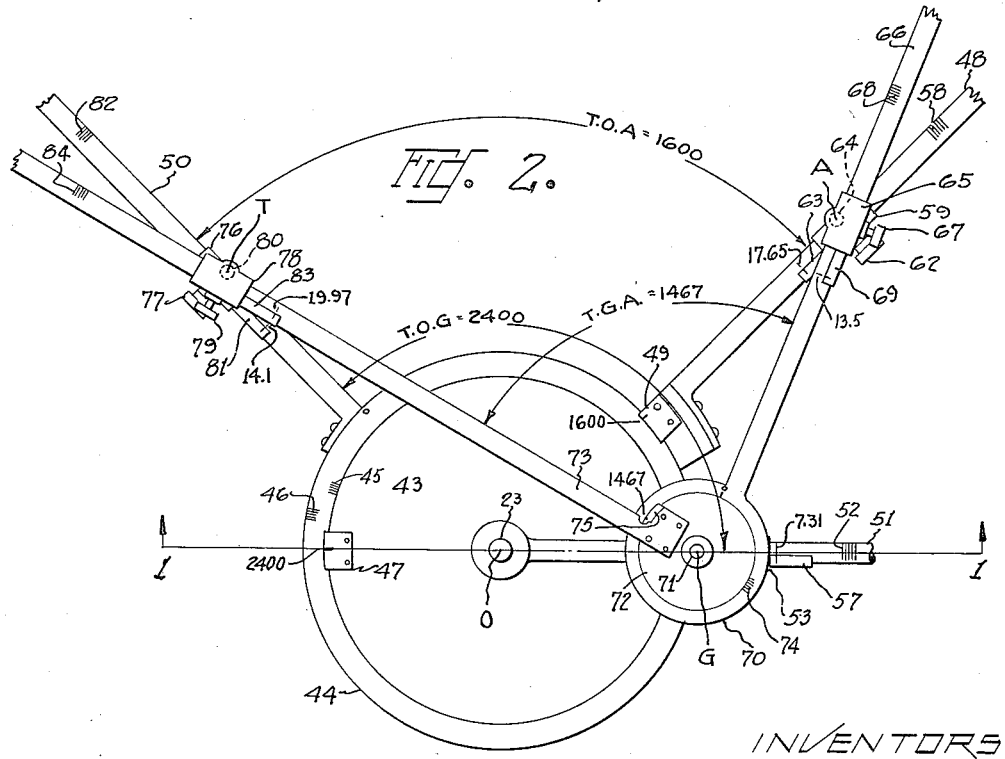
Fig. 2 is a plan of the device showing a representative setting of the instrument arms.

The distance between the observation point and gun position is established by means of a range finder or actual measurement, and the pivot 71, which corresponds with the gun position on the instrument, is moved to a corresponding position on the arm 51 which, in the example shown in Fig. 2, will be 7.31.

The distance from the observation point O to the aiming point A is likewise determined by a range finder and is set upon the scale 58 of the arm 48 by means of the vernier 63, the necessary movement being supplied by the rotation of the knurled head 62. This distance is 17.65.

The distance from the observation point O to the target T is then determined by means of a range finder and the setting of the pin 80 along the scale 82 is made by the rotation of the knurled screw 77, in this instance the setting being 14.1.

It is also necessary to set off the angle in mills between the target T and the aiming point A with the observation point O as a vertex. This setting may be at the vernier 49.

The final setting is the angle between the target T and the gun G with the observation O as a vertex.

The order of making the settings is of small importance and the values given are only for a representative example.

In this instrument the unit of angular measurement employed is that of the mill in which the circle is divided into six thousand four hundred parts and the scales 45 and 46 are correspondingly graduated, the verniers 47 and 49 making it possible to read accurately to one mill. In the example shown in Fig. 2 the vernier 47 is set at 24 hundred mills, which is the angle T. O. G. which, in this instance, has been established as twenty-four hundred mills, while the angle T. O. A. has been established as sixteen hundred mills, and is set at the vernier 49.

Two unknown quantities which are of importance and which it is desired to determine are the angle T. G. A., which is the firing angle, and also the distance T. G., which is the range in yards between the gun and the target.

The various arms having been set as described it follows that there have been constructed on the instrument two triangles which are proportional to the triangles O. T. G. and O. A. G., and since the triangles are similar their elements must also be proportional. Therefore it is clear that the reading on the vernier 75 which, in this instance, is fourteen hundred and sixty-seven mills, must be the firing angle between the base line G. A. and the firing line G. T. Also the range, or distance G. T., may be read directly from the vernier 83 which, in this case, is nineteen hundred and ninety-seven yards.

The setting on the arm 66 can be read on the vernier 69. In this instance, the reading being 13.5. It must be understood that this reading while not essential to the solving of the problem, may be used as a check on the other readings and settings.

Therefore it can be seen that all of the sides of the triangles are directly readable from the arms and all of the angles may be read directly or computed indirectly.

To those familiar with the common forms of artillery problems it is well understood that there is usually employed an observation point O from which must be visible the target, the aiming point and the gun position. It is vital that the aiming point be visible from the gun position, but it is neither necessary or desirable that the target be visible from the gun position.

What actually transpires when this instrument is used is that when a gun is placed in position and an aiming point and observation point selected for that position, there is at once established a base of angular measurement, namely the line O. A. The length of the line O. A. must of course be determined by any convenient method, as well as the distance O. G. between the gun and the observation point.

When these distances and angular measurements are once established and corresponding settings made thereon at the instrument the only factor which alters the problem is the change in the position of the target T. For any new position of the target for a given setting of the observation point, gun and aiming point, no other adjustment need be made at the instrument other than to set the pin 80 at a distance along the arm 50 to correspond with the length of the line O. T., and to move the arm 50 to the new angle T. O. G.

While in the position shown in the diagram in Fig. 3 the various arms on the instrument are parallel to the various lines in the problem, this is of course unnecessary as the orientation of the instrument has no bearing upon the solution of the triangles. In other words, for a given gun setting and target position, as well as observation and aiming points, certain of the values are findable by means of existing instruments such as range finders and angle measuring instruments. These established lines are then registered on the corresponding lower arms and dials of the instrument, which causes these arms to assume definite relative positions resulting thereby in the mechanical determination of the unknown factors in the problem without resorting to the use of mathematics, charts or other instruments other than those referred to.

It can be seen from the foregoing that maximum degrees of speed and accuracy are thereby attainable, and since these two elements are of major importance in the control of artillery fire it can be seen that not only is it possible to effect material savings in ammunition and gun life in the finding of a target, but also of greater importance is the fact that the target can be struck at the earliest possible moment.

We claim:

1. An instrument for solving problems in artillery fire control comprising adjustable members for simulating two triangles having a common base, one vertex at an end of said base having a pivot joint, the remaining vertexes having slidable pivot joints and means for setting and reading the angles of said triangles and for setting and reading the lengths of the sides thereof.

2. An instrument for solving problems in artillery fire control having in combination adjustable members for simulating a pair of triangles having a common base, the angles and lengths of the sides of said triangles being adjustable, each of the sides of the said triangles being pivotally connected at each end to an adjacent side, certain of said pivotal connections being slidable and scales associated with said triangles for reading the values thereof in angular and lineal measurements.

3. The instrument described in claim 2, together with means for establishing the length of the base of both triangles, the length of the adjacent sides extending from the base and the length of one hypothenuse, together with means for establishing the angle included between said base and one of said established sides, as well as the angle between said base and said hypothenuse.

4. The instrument described in claim 2 in which the base of the triangle consists of a graduated arm along the length of which is adjustably and pivotally mounted a gun arm protractor having a gun target range arm and a gun aiming point range arm, a double protractor pivotally mounted at the opposite end of said gun arm including a gun arm azimuth scale and a target arm azimuth scale, an observation point target arm radiating from the center of said double protractor and secured thereto and having a pivotal connection to said gun target range arm, said connection being slidable with relation to both said gun target range arm and observation point target arm, and an observation point aiming point arm pivotally mounted on the center of said double protractor and having a vernier reading on one of the scales thereof, and a pivotal connection slidably attached to each of said gun aiming point arm and said observation point and aiming point arm.

5. An instrument of the class described having in combination a head, a vertical spindle mounted on said head, a base plate supported by said spindle, a sleeve supported by said base plate in alignment with said first mentioned spindle, a gun arm azimuth plate secured near the upper end of said sleeve, a graduated observation point gun arm secured at the upper end of said sleeve, a pivot slidably mounted on said arm, a plate rotatably mounted on said pivot, a disk also mounted on said pivot, a vernier and scale carried by said plate and disk, a gun target arm mounted on said disk, a gun aiming point arm secured to said plate, a dial wheel surrounding said azimuth plate, said dial wheel having two scales thereon, a vernier on said azimuth plate for reading the innermost scale, an observation point target arm secured to said dial wheel, an observation point aiming point arm pivotally attached to the axis of said sleeve and having a vernier reading on the outermost dial wheel scale, the intersection of the gun aiming point arm with the observation point aiming point arm having pivotal sliding connections and the intersection of the gun target arm and the observation point target arm also having pivotal sliding connections.

ELLIS C. LYONS.
RAYMOND G. McMAHON.